Patented Nov. 3, 1953

2,657,972

UNITED STATES PATENT OFFICE 2,657,972

COPOLYMER OF L-LEUCINE AND DL-PHENYLALANINE

Robert B. Woodward, Cambridge, Mass.

No Drawing. Application September 6, 1952, Serial No. 308,303

7 Claims. (Cl. 18—54)

This invention relates to synthetic protein analogues and more particularly to new synthetic linear polypeptides, that is, polyamides of $\alpha$-amino acids and to the process for preparing same. More particularly the novel compositions of this invention are the copolymers of the $\alpha$-amino acids L-leucine and DL-phenylalanine. This class of copolymers has the general structural formula

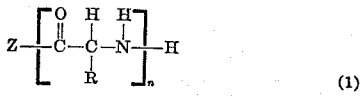

(1)

wherein Z is the non-active-hydrogen moiety of the initiator, R is selected from the group consisting of benzyl and isopropyl radicals, each in material quantities, and $n$ is an integer of at least 100.

One object of the present invention is the provision of a novel process analogous to polymerization for preparing high molecular weight compounds of the above type, particularly for the preparation of novel polypeptides having molecular weights sufficiently high to permit the formation of films or sheets and fibers. Molecular weights in excess of 13,000 and, in fact, molecular weights up to 100,000 and higher are readily obtained.

Another object of the invention is the production of fibers and films from the novel copolymer compositions of this invention.

According to the present invention, polypeptides of almost any desired molecular weight can be prepared by a self-propagating chain reaction analogous to polymerization. The components for carrying out the preparation of polypeptides in this manner are:

I. An initiator which can be any donor molecule, i. e., any molecule which has one or more atoms bearing unshared electron pairs such, for example, as a substance ZH in which H is an active hydrogen atom; that is, a substance such as water, an alcohol, a primary or secondary amine, an amino acid or a mercaptan.

II. A monomer of the general formula

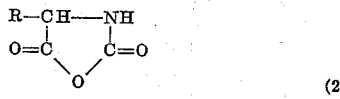

(2)

wherein R is as indicated in (1).

When these two components are introduced into a suitable solvent, reaction ensues in the following manner:

(a) One molecule of initiator attacks one molecule of monomer:

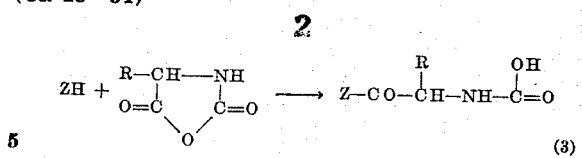

(3)

(b) The intermediate (3) is unstable, and decomposes spontaneously, in the sense;

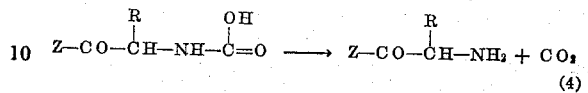

(4)

liberating an active center (—NH$_2$);

(c) The new molecule (4) attacks another molecule of the same monomer or a molecule of a different monomer for example:

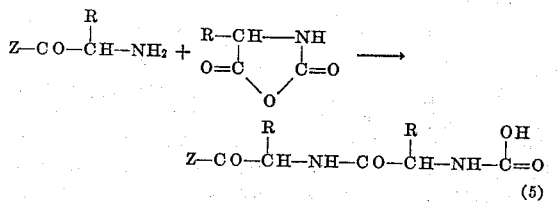

(5)

(d) Like (3), (5) is inherently unstable and decomposes in a similar manner, liberating again the same active center (—NH$_2$),

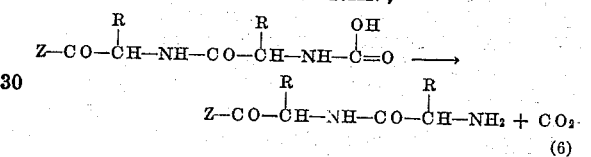

(6)

(e) This cycle is repeated again and again. Thus, the reaction is self-propagating, in that each time a new monomer unit is added to the chain, a new active center is created.

In this way, chains of any desired length can be made. The length of the chain depends on (a) the supply of monomer molecules, (b) the relative concentrations of monomer and initiator molecules, and (c) the relative rates of the chain-propagating and chain-initiating steps.

The process possesses many advantages as a model of polymerization reactions in that chain-terminating, chain-transfer, and, very probably, chain-branching reactions, are absent. As in other polymerization reactions, the products formed by the reaction in its simplest forms are ordinarily mixtures of molecules of the general formula (1) with different values of $n$. The simplicity of the system, however, permits a greater degree of control over the molecular weight distribution than is ordinarily possible in previously known polymerization reactions.

Thus, if an initiator is used which reacts relatively rapidly with the monomer, that is, initiates chains much faster than the chains are propagated, the chains grow at the same rate, and a fairly sharp molecular weight distribution is obtained. The chain growth can be stopped at will by the addition of a chain-terminating reagent, that is, a reagent which reacts with the active centers of the growing chain. Examples of such chain-terminating reagents are the acids, anhydrides, esters and acid chlorides. For example, acetic anhydride will react with the active centers of the growing chains in the sense:

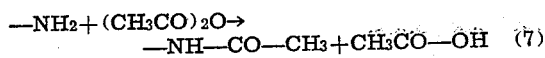

It is further significant that any product of the present invention can be used as the initiator of a further chain reaction of the above type. Thus, any substance of the general formula (1) with a given value of $n$ can be converted into a similar substance with a larger value of $n$ simply by further reaction with a new supply of monomer molecules.

In a similar way, other large molecules of natural or synthetic origin can be used as the initiator. In this fashion, for example, natural proteins can be modified by the addition of polypeptide chains at any point where the original molecule contains free —$NH_2$, —OH, —SH, or similar groups. Likewise, a synthetic polymer, such as polyvinyl alcohol, can be modified by the addition of polypeptide chains at various of its —OH groups, viz:

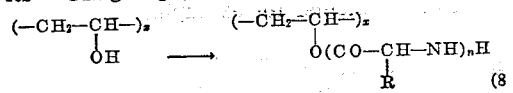

One of the important aspects of the process of the present invention is that it makes possible the formation of polypeptides of any desired molecular weight wherein there can be obtained repeating units of somewhat different chemical configuration; that is, high molecular weight compounds analogous to copolymers. For example, it is possible to take various mixtures of the N-carboxy amino acid anhydrides such as N-carboxy-L-leucine anhydride, N-carboxy-DL-phenylalanine anhydride, N-carboxy-DL-valine anhydride, O-acetyl-N-carboxy-L-tyrosine anhydride, ε-N-carbomethoxy-α-N-carboxy-DL-lysine anhydride, O-carbomethoxy-N-carboxy-L-tyrosine anhydride, etc., and by dissolving the same in a suitable solvent in the presence of an initiator to carry out the formation of a high molecular weight polypeptide whose —M— groups will be variously the corresponding groups of the said monomeric materials.

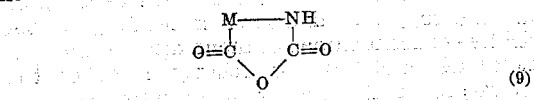

It is to be noted from the foregoing that the polypeptides of the present invention contain as their end groups a radical derived from the initiator molecule and by a suitable selection of initiators various properties can be imparted to the polypeptides of the invention adapting them, for example, for medicinal and pharmaceutical uses.

The following examples are illustrative of the invention.

*Example 1*

A solution prepared by dissolving 20.0 g. of L-leucine in 153 cc. of 1 N sodium hydroxide was cooled to 0° C. in an ice bath and 17.4 g. (14.0 cc.) of methyl chloroformate added in small portions, with shaking after each addition. An 8.2-g. portion of anhydrous sodium carbonate was then added. During the reaction a lumpy precipitate was formed. After shaking for one-half hour a clear solution was obtained. After standing overnight, the solution was acidified to pH 3 which deposited the reaction product, N-carbomethoxy-L-leucine, as an oil. The mixture was extracted with three portions of diethyl ether, and the ethereal solution filtered and evaporated under vacuum to yield the nearly colorless, oily N-carbomethoxy-L-leucine.

The N-carbomethoxy-L-leucine was converted to N-carbomethoxy-L-leucine acid chloride by heating with 32 cc. of thionyl chloride for one hour at 40° C. in a water bath. A reaction occurred with evolution of hydrogen chloride gas. Excess thionyl chloride was then removed by heating under vacuum at 40° C. The anhydride was obtained by further heating. The reaction began at about 60° C. with evolution of methyl chloride and was complete after heating at 75° C. for one hour. After standing overnight the reaction mixture deposited yellow-brown crystals of crude N-carboxy-L-leucine anhydride. Crystallization from a diethyl ether-petroleum ether mixture gave in two crops 15.7 g. of tan crystals of the anhydride. This was taken up in boiling cyclohexane, decolorized with charcoal, and gave on two crystallizations 8.10 g. (yield 34 per cent based on L-leucine) of nearly colorless needles of pure N-carboxy-L-leucine anhydride, melting point 76–78° C. (uncorr.) $(\alpha)_D^{24°} = -36.75°$ (0.5000 g. in 25 cc. benzene).

Calculated for $C_7H_{11}O_3N$: C, 53.49; H, 7.06; N, 8.91. Found: C, 53.70; H, 7.01; N, 8.70.

Formula:

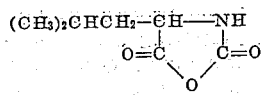

*Example 2*

To a solution of 20.0 g. of DL-phenylalanine in 120 cc. of 1 N sodium hydroxide was added 11.0 cc. of methyl chloroformate and 6.4 g. of anhydrous sodium carbonate. The reaction mixture was cooled in an ice bath and shaken occasionally for a period of one-half hour, then acidified with 1 N hydrochloric acid, which gave a deposit of a colorless oil. The oil was extracted with three portions of diethyl ether and the ethereal solution evaporated under vacuum to give N-carbomethoxy-DL-phenylalanine as a colorless glassy solid. This was heated with 30 cc. of thionyl chloride at 40° C. for forty-five minutes, then at 60° C. for fifteen minutes under vacuum to give a mass of bright yellow crystals. To these crystals 10 cc. of benzene was added and the mixture again heated at 60° C. for fifteen minutes. The residue was crystallized from benzene and gave in two crops 16.4 g. (71 per cent yield) of colorless plates of N-carboxy-DL-phenylalanine anhydride. A sample was further purified by another crystallization from benzene to give pure N-carboxy-DL-phenylalanine anhydride, melting point 127–127.5° C. (corr.).

Calculated for $C_{10}H_9O_3N$: C, 62.82; H, 4.47; N, 7.32. Found: C, 62.90; H, 4.83; N, 7.35.

Formula:

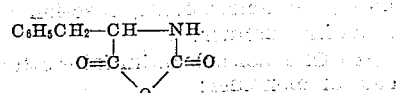

Example 3

One gram each of N-carboxy-L-leucine anhydride and N-carboxy-DL-phenylalanine anhydride were dissolved in approximately 75 cc. of ordinary reagent benzene (ACS reagent grade benzene) and sufficient acetone to bring the less soluble phenylalanine derivative completely into solution. The very small amount of water present in the reagent grade benzene served as initiator. The solution was allowed to stand at room temperature (approximately 25° C.). As the reaction proceeded, the solution became more and more viscous. When, after two weeks, portions of the solution were cast on glass, optically clear, mechanically stable, tough films were readily formed. Thus, the film was made up of molecules of the structure (1) with high values of $n$. Chemical analysis for the $\alpha$-amino nitrogen by the Van Slyke method has shown that $n$ is at least 100.

Example 4

A 2 per cent benzene solution of the polypeptide obtained in accordance with the process of Example 3 was introduced into a hypodermic syringe and ejected therefrom into petroleum ether, acetone and warm air, producing thin filaments or fibers of said polypeptide in each of said fluids. Other suitable mediums which can be employed are hexane, ethyl alcohol, mixtures thereof and the like.

The polypeptide copolymer of L-leucine and DL-phenylalanine was also found to produce an excellent film when cast in a thin sheet from benzene solution.

The initiator containing the active hydrogen atom should preferably be present in an amount less than one per cent by weight, based on the N-carboxyanhydride reaction mixture. Thus ACS reagent grade benzene has an upper limit for water of about 0.02 per cent. Accordingly, it is seen that the limit of the water initiator present in Example 3 is about 0.66 per cent by weight, based on the N-carboxyanhydride reaction mixture. Smaller quantities of initiator are desirable in obtaining copolymer compositions of high molecular weight. It has also been found that careful purification of the N-carboxyanhydride is a necessity for obtaining high molecular weight polypeptide compositions.

As pointed out hereinabove, the length of the polypeptide chains obtained in accordance with the present invention depends in part on the relative rates of the chain-propagating and chain-initiating processes. Water acts as an initiator whose initiating reaction, in general, is substantially slower than the chain-propagating reaction, as evidenced by the fact that the chain propagation may take place when carried out in a water solution. Examples of compositions whose initiating reaction is more rapid than the chain propagation are those containing hydroxyl ions, for example, solutions of quaternary ammonium hydroxides such as Triton B, which is a 40% aqueous solution of benzyl trimethyl ammonium hydroxide, and solutions of alkali hydroxides, such as sodium hydroxide and potassium hydroxide. Amino acids are donor molecules which act to initiate the reaction at approximately the same rate as the rate of propagation or chain growth.

Whereas Example 3 shows the preparation of the polypeptide copolymer at about room temperature, it is apparent that other temperature-time conditions can be employed, for example, heating the inert organic solvent containing the reaction mixture to a temperature of about 80° C. for a substantially shorter period of time than when the polymerization is brought about at room temperature. Other suitable reaction conditions are apparent to the skilled chemist.

The term "linear polypeptide copolymer" as used in the claims is to be understood to refer to a polypeptide having repeating units of the general configuration as shown at (1), which repeating units appear in the polypeptide chain one hundred times or more, that is, the valve $n$ is 100 or greater. Thus, the novel polypeptide copolymers of this invention have a molecular weight of at least about 13,000, where the said copolymer consists of substantially equimolecular quantities of the monomers L-leucine and DL-phenylalanine.

Synthetic polypeptides of low molecular weight have been reported but these have been either the undesired products of reactions intended for other purposes (Leuchs and Geiger, Ber., 41, 1721 (1908); Curtius and Sieber, Ber., 55, 1543 (1922); Wessely and John, Z. physiol. Chem., 170 38 (1927)), or the result of very complex experimental procedures which even as laboratory processes are for all practical purposes limited to the production of compounds having molecular weights of the order of 2,000 or less. Thus, the process of the present invention provides a novel class of synthetic polypeptides having molecular weights sufficiently high so that self-supporting sheets, films, foils, fibers, filaments, ribbons, cast articles of predetermined other shapes, and the like can be formed therefrom; that is, synthetic polypeptide copolymers having molecular weights of the order of 13,000 or higher.

The properties which characterize the polypeptide copolymers of this invention adapt them to a variety of uses. They can be drawn into fibers useful as artificial silk, artificial hair bristles, threads, filaments, yarns, strips, films, bands, and the like. The materials of the present invention also can be employed to advantage in paints, varnishes, lacquers and enamels in several ways. They can be used as substitutes for the resin constituents, as substitutes for the softener constituent, as substitutes for the total resin constituent or the softener constituent in clear or pigmented lacquer compositions. These resins also can be used for coating sheet materials such as, cloth, paper and leather. They can be used in this respect in combination with other plastic high polymers or plastics such as pyroxylin and also in combination with softening ingredients such as castor oil, cottonseed oil, ortricresyl phosphate. They also can be used as modifying ingredients in the preparation of plastic compositions for use either in the fabrication of molded articles or sheeted materials for use in various applications such as in the manufacture of safety glass.

It is to be understood that in all these applications, the compositions disclosed in this invention can be used either alone or in combination with cellulose derivatives such as cellulose acetate, cellulose nitrate, ethyl cellulose and benzyl cellulose; in combination with natural resins such as rosin, damar, Congo, Pontianac and Manila gums; along with synthetic resins such as phenol-formaldehyde, urea-formaldehyde, and polyhydric alcohol-polybasic acid condensation products; and in combination with softeners such as triacetin, triphenyl phosphate, dibutyl phthalate, tricresyl phosphate, cellosolve stearate, acetyllaurin, as well as castor oil, cottonseed oil, and other vegetable oils.

The instant application is a continuation-in-part of my copending application Serial No. 753,804, filed June 10, 1947, now abandoned.

Since certain changes can be made in this invention without departing from the spirit and scope thereof, it is intended that all matter contained in the above description shall be interpreted as illustrative and not in a limiting sense.

I claim:

1. The process of preparing synthetic linear polypeptide copolymers comprising the condensation of a mixture of N-carboxy-L-leucine anhydride and N-carboxy-DL-phenylalanine anhydride, with the evolution of carbon dioxide, in an inert organic solvent and in the presence of trace amounts of an initiator having an active hydrogen atom, and said copolymers are characterized by benzene-solubility, a degree of polymerization of at least 100, and fiber and film-forming ability.

2. The process of claim 1 wherein the reaction mixture consists of a substantially 1:1 molar ratio of the N-carboxy-anhydrides, the solvent is benzene, and the initiator is water in an amount not exceeding about 0.66 per cent by weight, based on the N-carboxyanhydride mixture.

3. A linear polypeptide copolymer of L-leucine and DL-phenylalanine having the structural formula:

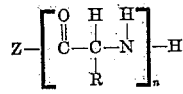

wherein R is selected from the group consisting of $-CH_2C_6H_5$ and $-CH_2CH(CH_3)_2$, each in material quantities, Z is the non-active-hydrogen moiety of the initiator, and $n$ is an integer of at least 100, said copolymers being characterized by benzene-solubility and fiber and film-forming ability.

4. A linear polypeptide copolymer of L-leucine and DL-phenylalanine having the structural formula:

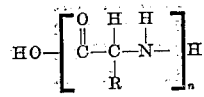

wherein R is selected from the group consisting of $-CH_2C_6H_5$ and $-CH_2CH(CH_3)_2$, each in material quantities, and $n$ is an integer of at least 100, said copolymers being characterized by benzene-solubility and fiber and film-forming ability.

5. The linear polypeptide copolymer of claim 4 wherein the copolymer consists of a substantially 1:1 molar ratio of L-leucine and DL-phenylalanine.

6. The process of producing a polypeptide fiber comprising the extrusion of a benzene solution of the copolymer of L-leucine and DL-phenylalanine, said copolymer having a degree of polymerization of at least 100, into a medium which extracts the benzene and is a non-solvent for said copolymer.

7. The fiber produced by the solvent-non-solvent spinning of a copolymer of L-leucine and DL-phenylalanine, wherein the said copolymer has a degree of polymerization of at least 100 and the copolymer comprises a substantially equimolecular quantity of the monomer units.

ROBERT B. WOODWARD.

References Cited in the file of this patent

UNITED STATES PATENTS

| Number | Name | Date |
|---|---|---|
| 2,007,633 | Bornhauser | July 9, 1935 |
| 2,071,253 | Carothers | Feb. 16, 1937 |
| 2,327,162 | Baldwin et al. | Aug. 17, 1943 |
| 2,425,550 | Lundgren | Aug. 12, 1947 |
| 2,572,844 | MacDonald | Oct. 30, 1951 |

FOREIGN PATENTS

| Number | Country | Date |
|---|---|---|
| 555,129 | Great Britain | Aug. 5, 1943 |

OTHER REFERENCES

Office of Technical Services, PB 34279, December 13, 1946.

Baldwin et al., J. Soc. Dyers Colourists, vol. 62, pp. 4 to 9, 1946.

Leuchs et al., Berichte Deut. Chem. Gesel., vol. 40, 1907, pp. 3235 to 3239; 3243.

Leuchs et al., Berichte Deut. Chem. Gesel., vol. 41, 1908, pp. 1721 to 1726.

Curtius et al., Berichte Deut. Chem. Gesel., vol. 55, 1922, pp. 1543, 1544, 1550, 1552, 1557.

Wessely, Z. Physiol. Chem., vol. 146, pp. 72–90, 1925.

Wessely et. al., Z. Physiol. Chem., vol. 159, pp. 102–19 (1926).

Meyer et al., Helvetica Chim. Acta., vol. 17, pp. 1488–92 (1934).

Go et al., Bull. Chem. Soc. Japan, vol. 14, pp. 510–516 (1939).

Brown et al., Nature, May 28, 1949, vol. 163, pp. 834 and 835.